United States Patent Office 2,801,044
Patented July 30, 1957

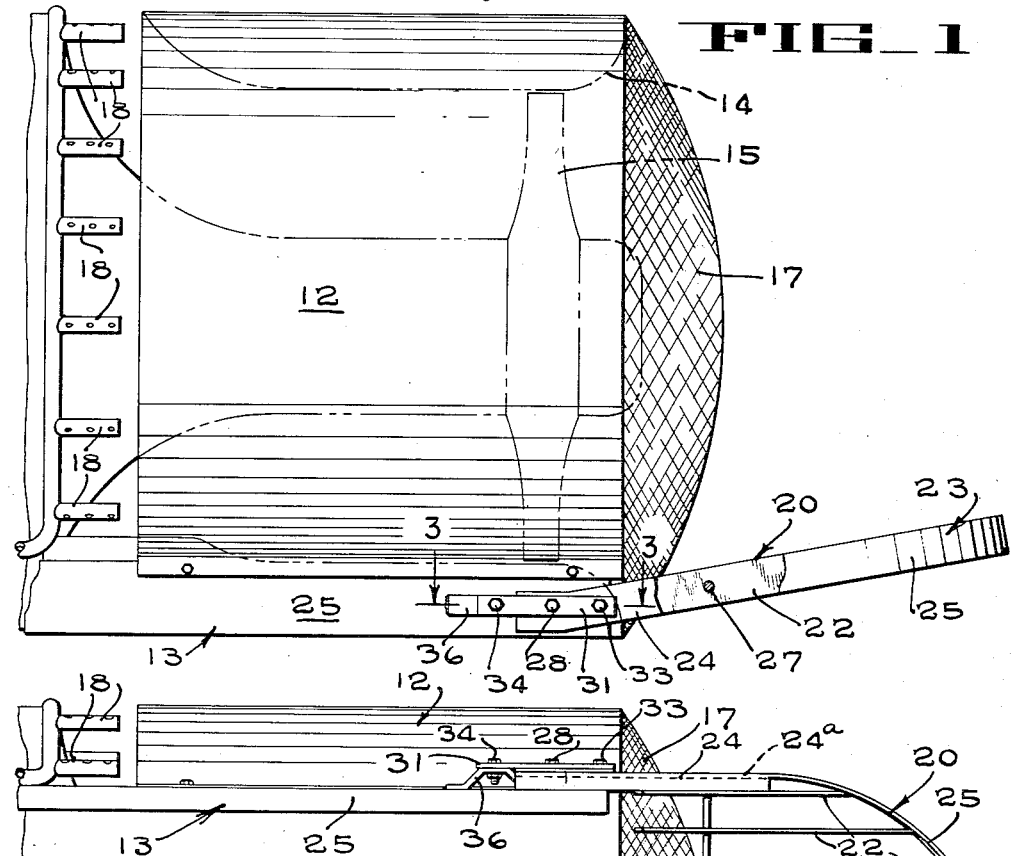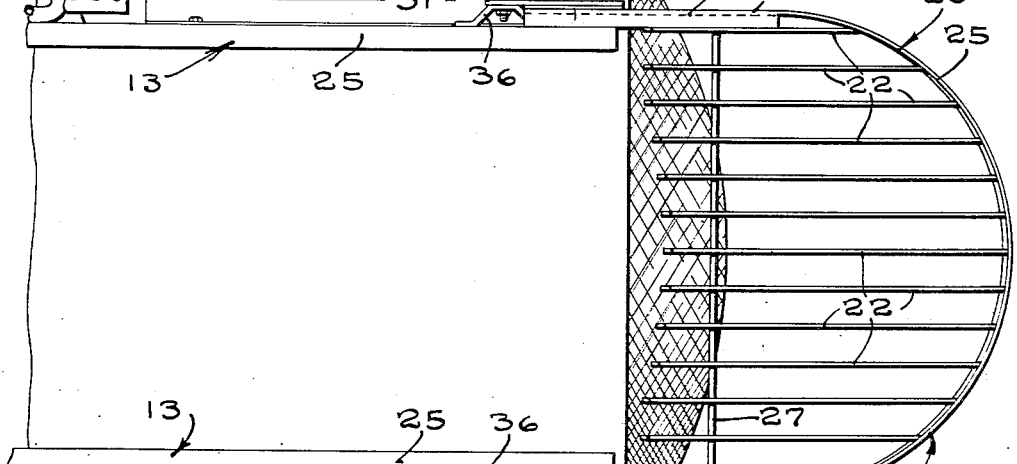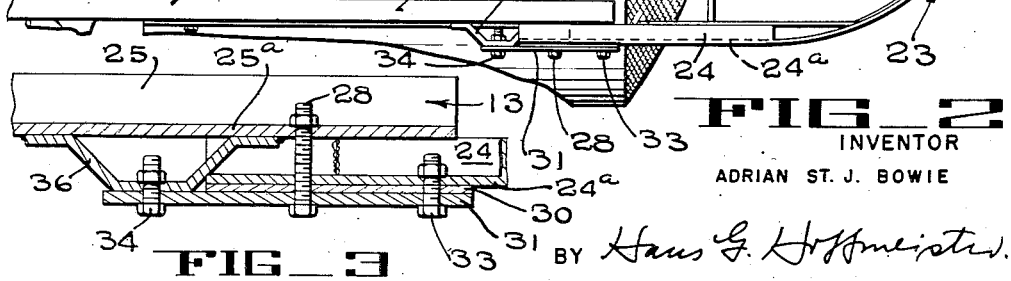

2,801,044

AIR VORTEX INTERCEPTOR

Adrian St. J. Bowie, San Jose, Calif., assignor to Food Machinery and Chemical Corporation, San Jose, Calif., a corporation of Delaware Application September 30, 1952, Serial No. 312,311

6 Claims. (Cl. 230—132)

This invention relates to improvements in agricultural and horticultural spraying and dusting apparatus, and more particularly concerns an improved air flow control means for obtaining an efficient circulation of air through a spraying or dusting machine to effectively dispense a spray material.

The air flow control apparatus of the present invention is particularly adapted for use with a large spraying machine such as that disclosed in the patent to Daugherty No. 2,476,960 wherein a large volume of air is drawn into the open front end of a vaned tunnel and is discharged at the rear end of the tunnel over nozzles arranged to discharge spray material into the air stream. Dirt, leaves, and twigs interfere with the circulation of the air through the tunnel and are ordinarily kept out of the tunnel by means of a screen disposed across the air intake opening. However, when excessive amounts of debris are entrained in the air, the screen itself becomes clogged and the efficiency of the circulating system is decreased.

In studying the operation of this type of spraying machine, it has been found that a large portion of the foreign substances that are drawn to the screen is carried by an air vortex that forms immediately in front of the air intake opening extending upwardly from the adjacent the ground where, besides picking up light material such as leaves, it picks up relatively heavy twigs, pebbles and the like. It is therefore an object of the present invention to provide means to impede the formation of an air vortex between the intake opening of the air tunnel and the ground to such an extent that foreign material cannot be lifted thereby and deposited on the screen of the air intake opening so that the efficient air circulation through the air tunnel and the proper spraying action of the machine is maintained.

Another object of the present invention is to provide means for preventing the entrainment, in the air stream of a power spraying machine, of relatively heavy debris, the discharge of which could damage the propeller of the machine or the crop being sprayed.

Other and further features, objects, and advantages of the present invention will be apparent from the following detailed description taken in connection with the accompanying drawings, in which:

Fig. 1 is a fragmentary side elevation of the air intake end of a spraying machine, with parts broken away to more clearly disclose the structure, and illustrating an air vortex interceptor constructed according to the teaching of the present invention.

Figure 2 is a fragmentary bottom plan view of the spraying machine of Figure 1.

Figure 3 is a horizontal sectional view taken on line 3—3 of Figure 1.

The preferred embodiment of the air vortex interceptor apparatus of the present invention is illustrated in the accompanying drawings as mounted on a power spraying machine, such as the machine disclosed in the Daugherty Patent No. 2,476,960. A sprayer of this type includes, in part, a housing 12, defining an air tunnel, suitably secured to and supported by a frame structure or chassis 13. A propeller 15, mounted for rotation inside the housing 12, draws air in through an opening 14 in the forward end of the housing. A screen 17 is disposed over the opening 14, as a safety precaution and to prevent leaves, dirt, twigs and the like from entering the tunnel. Air is directed rearwardly through the housing and then radially outwardly over a plurality of insecticide spray nozzles 18 from which the air picks up insecticide and carries it to the material to be sprayed.

The formation of a vortex of air in front of the screen 17 is impeded in the present invention by a grill 20 mounted adjacent the lower end of the air intake opening 14 and extending away from the structural frame 13 in a slightly upward inclined direction. During operation, the grill 20 is disposed relatively close to the ground, the distance therefrom being in the nature of from about 12 to 15 inches. The grill comprises a plurality of substantially straight rigid upright metal slats or baffles 22 mounted in a rigid U-shaped frame 23. The frame includes two spaced channel members 24, suitably secured to the structural frame 13 of the spraying machine as will be described hereinafter, and a curved band 25, integrally formed with the webs 24a of the two side channel members 24 and constituting a continuation thereof. The baffles 22 are rigidly secured, as by welding, in spaced relation at their forward end to the inner surface of the curved band 25, and are supported and maintained in spaced relation near their rear end by a rigid bar 27 that extends through and is welded to each baffle 22. The bar 27 is secured at its ends to the webs of the channel members 24. As best seen in Figure 1, the baffles 22 are of substantially the same height as the U-shaped frame 23. It will be understood that the baffles may be made of any height suitable for impeding or eliminating the lifting action of a vortex. It should also be noted that the grill 20 and the vanes 22 thereof are mounted on the machine in a substantially horizontal plane and are disposed in a plane substantially perpendicular to that of the intake opening 14 of the blower housing 12.

Each side channel member 24 of the grill frame 23 is removably secured to the frame 13 of the spraying machine by a bolt 28, Figure 3, that draws together the web 25a of a side-channel member 25 of the frame 13, the web 24a of the channel member 24, a spacer plate 30, and a connector plate 31. The connector plate 31 and the spacer plate 30 are secured to the channel 24 by a bolt 33, while the connector plate 31 is also secured by a bolt 34 to a support bracket 36, mounted on the side channel member 25.

In operation, the formation of a vortex is impeded by the disposition of the vaned baffles between the air intake opening of the blower and the ground. Tests have shown that, with the use of this device the heavier debris such as pebbles, twigs, and the like, which were picked up by the air vortex, that normally forms between the propeller of the machine and the ground are no longer picked up and, also, the ability of the air stream to pick up light material such as leaves, is greatly reduced. Prior to the adoption of this vortex interceptor, the spraying machine had to be shut down about every ten minutes to clean leaves and the like from the screen 17. When the vortex interceptor is used, the sprayer can be operated several times as long before the screen has to be cleaned.

This novel use of a plurality of spaced vanes, disposed across the flow path of air in an incipient air vortex, to impede or prevent the formation of the vortex between the interceptor and the ground and to decrease the ability of the air stream to entrain even light foreign material, provides a valuable means for maintaining the efficiency of the spraying machine.

While I have shown and described a preferred embodiment of my invention, such invention is capable of modification and variation without departing from the spirit and scope thereof as defined in the claims appended hereto.

Having thus described my invention, what I claim and desire to protect by Letters Patent is:

1. In a spraying machine wherein a power driven blower draws air upwardly from adjacent the ground into its air intake opening, the improvement which comprises a grill mounted in a substantially horizontal plane on the machine and disposed between said air intake opening and the ground, said grill extending outwardly from the air intake opening and comprising a plurality of spaced, upright, rigid vanes to intercept and break up vortex forming air currents thereby reducing the capacity of the air currents to entrain and lift material toward the air intake opening.

2. In combination in a spraying machine, a support structure, a blower housing mounted on said support structure and having an air intake opening spaced above the ground, a blower for drawing air into said opening, and a plurality of spaced vanes mounted on said support structure in a cantilever manner and extending into the air stream of said blower between the air intake opening and the ground to intercept a portion of the air flowing into said intake opening.

3. In combination in a spraying machine, a support structure, a blower supported on said support structure and having an air intake opening spaced above the ground and disposed in a plane substantially perpendicular to the ground, means for drawing air into said opening, and a plurality of spaced, rigid, upright vanes mounted on said support structure adjacent the lower edge of the air intake opening and extending outwardly from the support structure in a plane substantially perpendicular to that of the intake opening of the blower into the air stream of the blower between the intake opening and the ground.

4. In combination in a spraying machine, a support structure, a blower housing mounted on said support structure and having an air intake opening spaced above the ground, a rotary blower disposed in said housing and adapted to draw air from the ground into the opening, and a plurality of substantially horizontally extending spaced vanes disposed in substantially vertical planes substantially parallel to the axis of said blower between the intake opening and the ground.

5. In combination in a spraying machine, means defining a blower housing having an air intake opening spaced above the ground, a blower for drawing air into said opening, and a plurality of rigid, spaced vanes, disposed in substantially parallel vertical planes and extending into the air stream of said blower in a longitudinally extending substantially horizontal position between said opening and the ground to define parallel air flow passages, said vanes having material extent in said vertical planes whereby to permit longitudinal passage of air upwardly through said flow passages but to prevent transverse movement of air in said passages.

6. In combination in a spraying machine, a support structure, a blower housing mounted on said support structure, means defining an air intake opening for said housing spaced above the ground, a propeller arranged to draw air upwardly from adjacent the ground and into said housing through said air intake opening, a substantially U-shaped frame member having straight opposite side members secured to said support structure and an arcuate connector bar secured to said side portions and extending to a position in front of said air intake opening and above the ground, a plurality of upstanding vanes disposed in said frame having forward end portions secured to said arcuate bar, and a rod secured between said frame side members and extending through and attached to each vane adjacent the rear end thereof.

References Cited in the file of this patent

UNITED STATES PATENTS

| | | |
|---|---|---|
| 1,900,315 | Valiquette | Mar. 4, 1933 |
| 2,319,640 | Sink | May 18, 1943 |
| 2,544,281 | Seil | Mar. 6, 1951 |
| 2,569,274 | Andrews | Sept. 25, 1951 |
| 2,625,010 | Clark | Jan. 13, 1953 |
| 2,641,504 | Robinson | June 9, 1953 |
| 2,655,891 | Gorski | Oct. 20, 1953 |